Oct. 26, 1948.    A. J. BENT    2,452,176
FLUID PRESSURE CONTROLLED ACTUATOR
Filed March 14, 1945
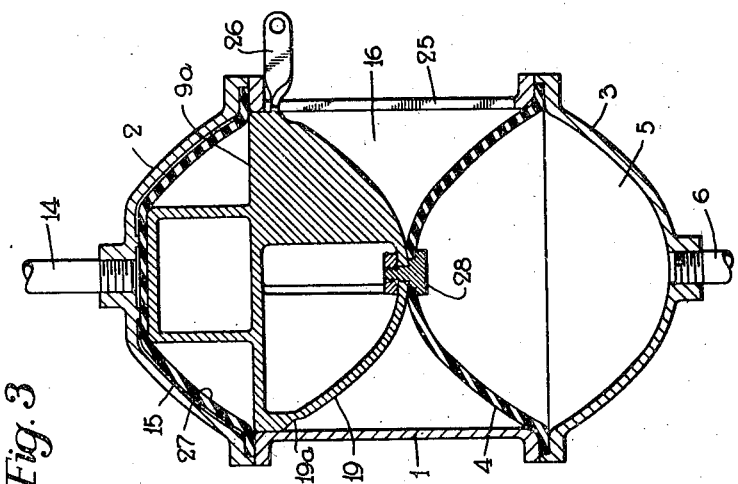
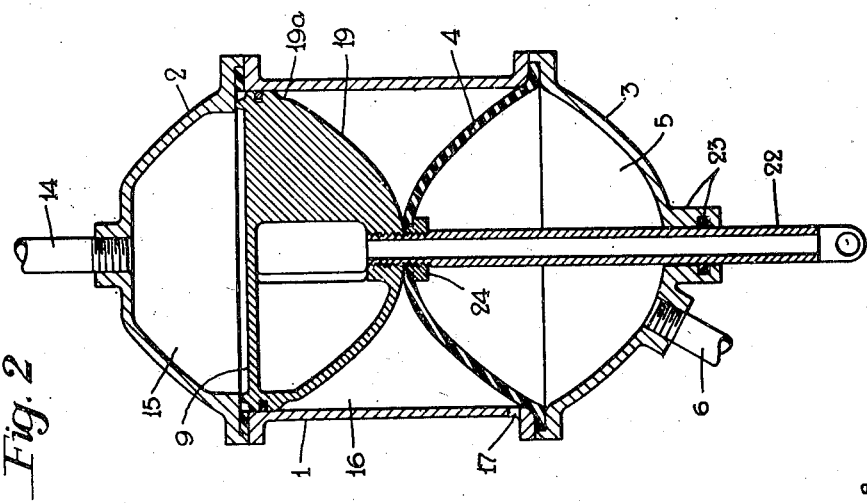
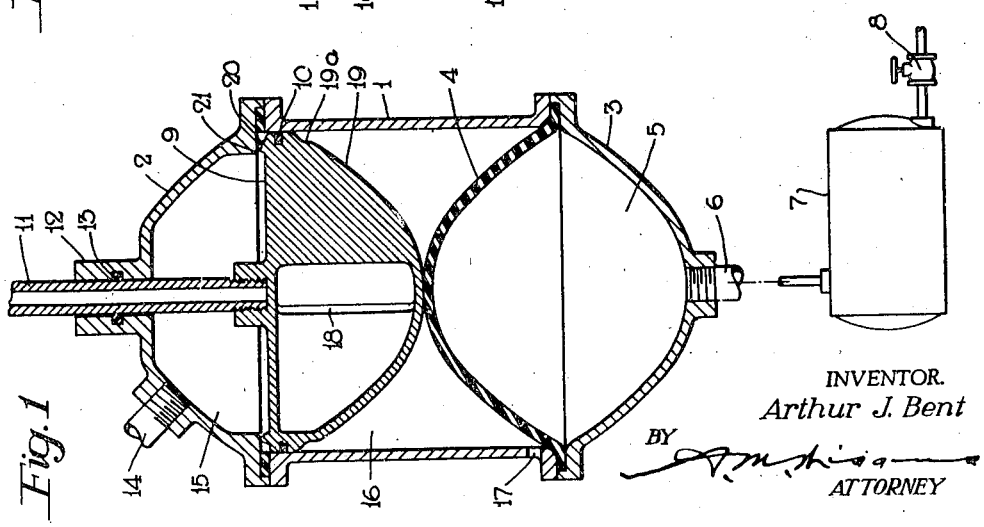
INVENTOR.
Arthur J. Bent
BY
ATTORNEY Patented Oct. 26, 1948

2,452,176

UNITED STATES PATENT OFFICE 2,452,176

FLUID PRESSURE CONTROLLED ACTUATOR

Arthur J. Bent, Wilkinsburg, Pa., assignor to The Westinghouse Air Brake Company, Wilmerding, Pa., a corporation of Pennsylvania Application March 14, 1945, Serial No. 582,717

4 Claims. (Cl. 267—1)

This invention relates to fluid motors, and more particularly to the type of such motors commonly known in certain branches of this art as pneumatic actuators.

Pneumatic actuators are employed for a variety of purposes. In certain types of applications, notably on aircraft, it is highly desirable that these actuators be of simple construction, relatively light in weight, and very reliable and accurate in operation. While pneumatic actuators wherein a piston or other form of movable abutment is actuated against the opposing force of a spring have been in general use and are satisfactory for many purposes, there are certain fields of application, as in the aircraft field, where pneumatic actuators wherein the piston or movable abutment operates against opposing air pressure are superior. The present invention has for its object to provide a pneumatic actuator of this latter type which is particularly suited for aircraft installation and also for all other applications where light weight and a high degree of reliability and accuracy are of importance.

The present invention is diagrammatically illustrated in the attached drawing, wherein Fig. 1 shows a preferred form of the invention, Fig. 2 shows a modified form of the invention, wherein devices can be actuated from both ends of the actuator, and Fig. 3 shows another modification wherein devices can be actuated from the side of the actuator as well as from an end.

Referring now to Fig. 1, the actuator comprises a casing body 1 having end caps 2 and 3 which may be secured to the body 1 by any suitable and well known means. For aircraft installations these three parts should be made of aluminum or aluminum alloy.

Between the cap 3 and body 1 is clamped a flexible diaphragm 4, preferably of rubber composition, which defines with the end cap a pressure tight chamber 5. The end cap 3 is provided with outlet connection 6 which may be connected to a reservoir 7, which may in turn be connected to a suitable source of supply of fluid under pressure through valve 8. While I have indicated that a reservoir 7 may be connected to the chamber 5, the essential characteristic pertinent to the invention is that there be a pressure tight chamber, as at 5, in which air pressure at a selected value may be maintained.

Also disposed in the casing body is a movable abutment or member 9, here shown as in the form of a piston provided with the usual piston ring or rings 10. This abutment has connected thereto a stem 11 which passes through a guide sleeve 12 forming part of the end cap 2 and provided with the customary packing 13. The manner in which the stem 11 is secured to the abutment 9 is not of great importance and any suitable form of connection may be employed.

The end cap 2 is provided with a pipe connection 14 for the purpose of conducting air under pressure to chamber 15 formed between the abutment 9 and the end cap 2.

The movable abutment 9 with the diaphragm 4 and the casing 1 define a non-pressure chamber 16 open to the atmosphere by way of a port 17. By a non-pressure chamber is meant one which is normally at atmospheric pressure.

The movable abutment 9 is shown in the form generally of a paraboloid, preferably of hollow construction reinforced by one or more ribs 18. The rear surface 19 of the abutment is so shaped that when the abutment is at its extreme left-hand position, where a rib 20 thereon engages stop 21 on end cap 2, it will just engage in tangential relationship the adjacent surface of the diaphragm 4. As the abutment 9 moves to the right toward diaphragm 4 the surface 19 will increasingly engage and deflect to the right of the diaphragm. The full purpose of this will appear presently.

The exact curvature of the surface 19 will depend upon the desired relationship between the degree of pressure in chamber 15 and the degree of movement of movable abutment 9. If a straight-line relationship is desired it will be found from experiment that surface 19 should conform substantially in curvature to a parabola, as viewed in Fig. 1. The diaphragm 4 should, in the position shown in Fig. 1, have the same curvature. Further, in order to assure that this straight-line relationship is maintained for movement of the abutment both to the right and on its return to the left, the parabolic surface 19 must be provided with an annular recess or indentation 19a located adjacent the base of the parabolic contour. This indentation is for the purpose of providing a receiving space for the diaphragm 4 when the abutment 9 approaches the full limit of its stroke to the right. If this indentation is not provided the straight-line relationship between pressure in chamber 15 and movement of abutment 9 will not be maintained for the full stroke of the abutment.

The operation of the pneumatic actuator illustrated in Fig. 1 will be apparent from the foregoing description. When conditioning the device for operation air pressure is established in chamber 5 to the desired degree. This degree will be determined according to the device or devices to be actuated and according to the range of pressures to be admitted to chamber 15.

When the device has been thus conditioned, air pressure is admitted to chamber 15 to the degree desired. As soon as air pressure is established in chamber 15 it will act on abutment 9 and the abutment will thus move to the right. This movement is resisted by the pressure acting on the right of diaphragm 4. As the abutment moves to the right its rear surface 19 increasingly engages the adjacent curved surface of diaphragm 4, so that the effective resistance of the pressure in chamber 5 correspondingly increases.

By the proper design of the surface 19 and diaphragm 4, as previously described, the desired relationship between pressure in chamber 15 and degree of movement of abutment 9, and thus stem 11, can be obtained. As illustrated, the surface 19 is a substantially parabolic surface, as is that of diaphragm 4, which will give a substantially straight-line relationship between pressure and movement. Thus if the actuator is connected to the fuel supply mechanism on an airplane the fuel supply can be graduated directly according to the pressure in chamber 15.

The modification shown in Fig. 2 differs from the embodiment shown in Fig. 1 only by the addition of a second rod 22 attached to the rear side of the movable abutment 9. Since this rod must pass through the end cap 3 and the diaphragm 4 a guide sleeve and packing 23 must be provided in the end cap and a nut 24 may be provided for clamping the diaphragm 4 against the rear side of the surface 19 at its point of contact with the diaphragm 4. In all other respects the embodiment is the same as, and operates in the manner of, that shown and described in Fig. 1.

In the embodiment of Fig. 3 the casing body 1 may be provided with a slot 25 through which may project an arm 26 integral with or secured to the abutment 9a. The arm 26 will thus provide for actuating a device to one side of the actuator.

In order to provide for this side actuation, a diaphragm 27 must be employed in conjunction with the abutment 9a, so that air pressure in chamber 15 will not escape through slot 25 as the abutment moves inwardly. For such an arrangement the abutment is preferably attached to the diaphragm 4 by screw 28.

When the diaphragm 27 is employed it may be necessary to vary the shape of the surface 19 somewhat from the parabolic surface used in Fig. 1 and Fig. 2, if a straight-line relationship between pressure and movement is to be retained. This is due to the fact that the diaphragm 27 may not move with the same exactness as does the piston 9. This is a matter which must be determined empirically dependent upon the characteristics desired.

It will be obvious that features of the three figures shown can be combined if desirable to do so.

Having now described my invention, what I claim as new and desire to secure by Letters Patent, is:

1. A pneumatic actuator comprising a casing, a diaphragm in said casing defining therewith a pressure tight chamber, and a movable member disposed in said casing and having one side provided with a parabolic face adapted to progressively engage the said diaphragm when the member moves theretoward.

2. A pneumatic actuator comprising a casing, a diaphragm secured therein and defining with the casing a pressure tight chamber, and a movable member also disposed in said casing and arranged to move toward said diaphragm, said member having a parabolic surface on one side arranged to engage said diaphragm over a progressively increasing area as the member moves theretoward.

3. A pneumatic actuator comprising a casing, a diaphragm disposed in said casing and defining at one end thereof a pressure tight chamber, and a member disposed in said casing and arranged to move toward and away from said diaphragm, said member having the side adjacent said diaphragm of parabolic shape whereby to engage said diaphragm on movement theretoward over an increasing area.

4. A pneumatic actuator comprising a casing, a diaphragm in said casing forming therewith a pressure tight chamber, a movable member disposed in the casing and movable toward and away from said diaphragm, and means attached to the member and forming a parabolic surface arranged to engage the diaphragm as the member moves theretoward, said parabolic surface having an annular indentation therearound near its base.

ARTHUR J. BENT.

REFERENCES CITED

The following references are of record in the file of this patent:

UNITED STATES PATENTS

| Number | Name | Date |
|---|---|---|
| Re. 2,461 | James | Jan. 15, 1867 |
| 598,982 | Egger | Feb. 15, 1898 |
| 786,236 | Ross | Mar. 28, 1905 |
| 1,328,496 | Cox | Jan. 20, 1920 |
| 1,374,780 | Thompson | Apr. 12, 1921 |
| 1,572,095 | Pye | Feb. 9, 1926 |
| 2,023,135 | Hawkins | Dec. 3, 1935 |

FOREIGN PATENTS

| Number | Country | Date |
|---|---|---|
| 485,617 | Great Britain | 1938 |
| 613,588 | Germany | May 22, 1935 |